United States Patent
Thai et al.

(10) Patent No.: US 11,926,078 B2
(45) Date of Patent: Mar. 12, 2024

(54) METHOD FOR FABRICATING COMPOSITE STRUCTURES USING COMBINED RESIN FILM AND DRY FABRIC

(71) Applicant: Rohr, Inc, Chula Vista, CA (US)

(72) Inventors: Bryan Thai, Poway, CA (US); Delphine Turpin, San Diego, CA (US)

(73) Assignee: ROHR, INC, Chula Vista, CA (US)

( * ) Notice: Subject to any disclaimer, the term of this patent is extended or adjusted under 35 U.S.C. 154(b) by 173 days.

(21) Appl. No.: 17/344,549

(22) Filed: Jun. 10, 2021

(65) Prior Publication Data

US 2021/0299920 A1  Sep. 30, 2021

Related U.S. Application Data

(62) Division of application No. 15/017,187, filed on Feb. 5, 2016, now Pat. No. 11,059,206.

(51) Int. Cl.
 *B29C 70/20* (2006.01)
 *B29B 11/16* (2006.01)
 (Continued)

(52) U.S. Cl.
 CPC ............ *B29C 43/203* (2013.01); *B29B 11/16* (2013.01); *B29B 15/105* (2013.01);
 (Continued)

(58) Field of Classification Search
 CPC ....... B29C 70/16; B29C 70/20; B29C 70/205; B29C 70/342; B29C 70/44; B29C 70/462
 See application file for complete search history.

(56) References Cited

U.S. PATENT DOCUMENTS 4,659,425 A * 4/1987 Eggers .................... B32B 38/08
                                                156/324
4,681,724 A   7/1987 Faiz
         (Continued)

FOREIGN PATENT DOCUMENTS

CN        103909659        7/2014
CN        104812567        7/2015
             (Continued)

OTHER PUBLICATIONS

Kim, B.C., K. Potter, P.M. Weaver, Multi-tow shearing mechanism for high-speed manufacturing of variable angle tow composites, ECCM15—15th European Conference on Composite Materials (Jun. 2012), pp. 1-8. (Year: 2012).*
(Continued)

*Primary Examiner* — Matthew J Daniels
(74) *Attorney, Agent, or Firm* — SNELL & WILMER L.L.P.

(57) ABSTRACT

A method for creating a fan cowl with a hollow hat stiffener includes pressing a resin film between a non-crimp fabric (NCF) and a release poly-film to create a resin-fabric sheet. The method further includes cutting the resin-fabric sheet to a pre-determined shape to create at least one of a first resin-fabric preform, a second resin-fabric preform, and a third resin-fabric preform, draping at least the first resin-fabric preform over a tool to create an outer layer of the fan cowl, setting a mandrel over the outer layer, and draping the second resin-fabric preform over at least a portion of the mandrel and at least a portion of the first resin-fabric preform to form the hollow hat stiffener having a geometry similar to a shape of the mandrel.

11 Claims, 8 Drawing Sheets

(51) Int. Cl.
| | |
|---|---|
| *B29B 15/10* | (2006.01) |
| *B29C 43/20* | (2006.01) |
| *B29C 70/46* | (2006.01) |
| *B29C 70/50* | (2006.01) |
| *B29C 70/54* | (2006.01) |
| *B29L 9/00* | (2006.01) |

(52) U.S. Cl.
CPC ......... *B29C 70/465* (2013.01); *B29C 70/506* (2013.01); *B29C 70/545* (2013.01); *B29C 43/206* (2013.01); *B29L 2009/00* (2013.01)

(56) References Cited

U.S. PATENT DOCUMENTS

| | | | |
|---|---|---|---|
| 4,786,343 A | 11/1988 | Hertzberg | |
| 5,217,766 A | 6/1993 | Flonc | |
| 5,234,757 A | 8/1993 | Wong | |
| 5,660,901 A | 8/1997 | Wong | |
| 6,458,309 B1 | 10/2002 | Allen et al. | |
| 6,632,502 B1 | 10/2003 | Allen | |
| 7,625,618 B1 | 12/2009 | Allen et al. | |
| 7,807,258 B2 | 10/2010 | Liu | |
| 7,905,972 B2 | 3/2011 | Xie | |
| 8,231,965 B2 | 7/2012 | Hata | |
| 8,303,761 B2 | 11/2012 | Inserra Imparato | |
| 8,900,391 B2 | 12/2014 | Silcock | |
| 9,017,814 B2 | 4/2015 | Xie | |
| 2004/0043144 A1 | 3/2004 | Carter et al. | |
| 2009/0098284 A1 | 4/2009 | Xie et al. | |
| 2010/0006739 A1* | 1/2010 | Robins | B29D 99/0014 249/63 |
| 2010/0051183 A1 | 3/2010 | Boke | |
| 2012/0175822 A1 | 7/2012 | Inamiya | |
| 2012/0318182 A1* | 12/2012 | Wockatz | D04H 3/002 112/440 |
| 2013/0079434 A1 | 3/2013 | Castagnet | |
| 2014/0087198 A1* | 3/2014 | Hou | B32B 27/12 242/525 |
| 2014/0248143 A1* | 9/2014 | Ortiz Del Cerro | B29C 70/44 415/208.1 |
| 2014/0370237 A1 | 12/2014 | Ponsolle | |
| 2015/0258712 A1 | 9/2015 | Moser | |

FOREIGN PATENT DOCUMENTS

| | | | | |
|---|---|---|---|---|
| EP | 1197315 | | 4/2002 | |
| WO | WO-0027632 A1 * | | 5/2000 | ............. B29C 70/44 |
| WO | 2009016552 | | 2/2009 | |
| WO | 20090016552 | | 2/2009 | |

OTHER PUBLICATIONS

European Patent Office, European Search Report dated Oct. 25, 2017 in Application No. 17153957.0.
European Patent Office, Partial European Search Report dated Jul. 25, 2017 in Application No. 17153957.0.
China Patent Agent (H.K.) Ltd., First Chinese Office Action dated Aug. 27, 2019 in Application No. 201710064460.4.
Claire Swedberg, "Aerospace Materials Provider Automates Prepreg Temperature-Tracking", RFID Journal, Emerald Expositions, LLC, Published Aug. 16, 2011, https://www.rfidjournal.com/articles/view?8704. (Year: 2011), pp. 1-2.
China National Intellectual Property Administration., Second Chinese Office Action dated Apr. 7, 2020 in Application No. 201710064460.4.
USPTO, Restriction/Election Requirement dated Dec. 28, 2017 in U.S. Appl. No. 15/017,187.
USPTO, Non-Final Office Action dated May 17, 2018 in U.S. Appl. No. 15/017,187.
USPTO, Final Office Action dated Nov. 27, 2018 in U.S. Appl. No. 15/017,187.
USPTO, Advisory Action dated Feb. 5, 2019 in U.S. Appl. No. 15/017,187.
USPTO, Non-Final Office Action dated Aug. 16, 2019 in U.S. Appl. No. 15/017,187.
USPTO, Final Office Action dated Dec. 18, 2019 in U.S. Appl. No. 15/017,187.
USPTO, Advisory Action dated Mar. 5, 2020 in U.S. Appl. No. 15/017,187.
USPTO, Non-Final Office Action dated Apr. 1, 2020 in U.S. Appl. No. 15/017,187.
USPTO, Final Office Action dated Sep. 3, 2020 in U.S. Appl. No. 15/017,187.
USPTO, Notice of Allowance dated Mar. 17, 2021 in U.S. Appl. No. 15/017,187.
European Patent Office, European Partial Search Report dated Nov. 9, 2021 in Application No. 21173662.4.
European Patent Office; Extended European Search Report dated Mar. 2, 2022 in Application No. 21173662.4.
European Patent Office, European Search Report dated Jan. 23, 2023 in Application No. 22201170.2.
5M: "Technical Data Sheet Letoxit LFX 035", dated Nov. 1, 2011, URL: https://www.5m.cz/wp-content/uploads/2017/01/tl-lfx-035-en.pdf. 5 pages.
Anonymous: "Marine Engineering by The Chelsea Magazine Company—Issuu", dated Jan. 31, 2014, URL: https://issuu.com/chelseamagazines/docs/marineengineering_-_download. 5 pages.

* cited by examiner

METHOD FOR FABRICATING COMPOSITE STRUCTURES USING COMBINED RESIN FILM AND DRY FABRIC

CROSS REFERENCE TO RELATED APPLICATIONS

This application is a divisional of, and claims priority to, and the benefit of U.S. patent application Ser. No. 15/017,187, filed on Feb. 5, 2016, and entitled "METHOD FOR FABRICATING COMPOSITE STRUCTURES USING COMBINED RESIN FILM AND DRY FABRIC" which is incorporated by reference herein in its entirety for all purposes.

FIELD

The present disclosure relates to the fabrication of laminate composite structures using the process of resin film infusion, and more particularly to preparation and lay up of the multiple dry fabric and resin film preforms into a laminate structure prior to curing.

BACKGROUND

Resin film infusion is a known process for manufacturing laminate composite structures which uses, as its basic feedstock material, sheets of resin film and dry fabric. The resin film and the dry fabric sheets are laid up in alternating layers onto or into a forming tool, and then heated for consolidation and then curing. During heating, the resin film first melts, or undergoes a significant viscosity reduction, and wets the adjoining fibers substantially completely coating or encapsulating them. The resin and now-wetted fibers then cure into a single solid structure.

Resin film infusion is selected as an effective and efficient process for forming many large composite structures. But, when a laminate structure requires internal laminate edges (where the resin and dry fabric sheets have an edge that is overlaid on a prior layer, and will not form part of a perimeter of the part) resin film infusion can result in a part with degraded material properties because of the propensity of the dry fabric sheet edges to fray, and the difficulty in precisely aligning edges of the resin film sheet with edges of the dry fabric sheet.

SUMMARY

Methods of creating composite structures are provided. A method for creating a laminate composite structural component may comprise: placing a dry fabric over a tool, the tool comprising a contour of at least a portion of the laminate composite structural component; pressing a first resin film over the dry fabric while the dry fabric is draped over the tool to create an outer layer of the laminate composite structural component; repeating the placing and pressing process until a desired thickness of the outer layer is achieved; compressing a second resin film and a dry fiber fabric between two rollers to tack the second resin film to the dry fiber fabric to create a resin-fabric sheet comprising a resin film layer and an dry fiber fabric layer; cutting the resin-fabric sheet to a pre-determined shape to create at least one resin-fabric preform; and draping a first resin-fabric preform over at least a portion of the outer layer, wherein one or more edges of the first resin-fabric preform overlap the outer layer to create an internal edge.

In various embodiments, the method may further comprise, rolling a release poly-film over the resin-fabric sheet, the second resin film located between the release poly-film and the dry fiber fabric. The tacking may be performed at room temperature. The dry fiber fabric may comprise a carbon fiber, non-crimp fabric. The method may further comprise, setting a mandrel over the outer layer, wherein the first resin fabric preform is placed over at least a portion of the mandrel to create a feature. The method may further comprise, draping a second resin-fabric preform over at least a portion of the first resin-fabric preform, wherein one or more edges of the second resin-fabric preform overlap the internal edge.

A method for creating a fan cowl with a hollow hat stiffener may comprise: pressing a resin film between a non-crimp fabric (NCF) and a release poly-film to tack the resin film to the NCF and the release poly-film and to create a resin-fabric sheet comprising at least a resin film layer and an NCF layer; cutting the resin-fabric sheet to a pre-determined shape to create at least one of a first resin-fabric preform, a second resin-fabric preform, and a third resin-fabric preform; draping at least the first resin-fabric preform over a tool to create an outer layer of the fan cowl; setting a mandrel over the outer layer; and draping the second resin-fabric preform over at least a portion of the mandrel and at least a portion of the first resin-fabric preform to form the hollow hat stiffener having a geometry similar to a shape of the mandrel.

In various embodiments, the method may further comprise, draping the third resin-fabric preform over at least a portion of the second resin-fabric preform to create a desired thickness of the hollow hat stiffener. The method may further comprise, heating the first resin-fabric preform, the second resin-fabric preform, and the third resin-fabric preform to cure the first resin-fabric preform, the second resin-fabric preform, and the third resin-fabric preform to create the fan cowl. The method may further comprise, removing the mandrel from the fan cowl. In response to the first resin-fabric preform being draped over the tool with the resin film layer contacting the tool, the resin film layer of the second resin-fabric preform may be adjacent to the NCF layer of the first resin-fabric preform. In response to the first resin-fabric preform being draped over the tool with the NCF layer contacting the tool, the NCF layer of the second resin-fabric preform may be adjacent to the resin film layer of the first resin-fabric preform. The pressing may be performed at a room temperature.

A method may comprise: storing a resin film in a cold storage environment; storing a non-crimp fabric (NCF) at a room temperature; removing the resin film from the cold storage environment to increase a temperature of the resin film to the room temperature; tacking the resin film to the non-crimp fabric (NCF) to create a resin-fabric sheet comprising a resin film layer and an NCF layer; cutting the resin-fabric sheet to a pre-determined shape to create a resin-fabric preform; and draping the resin-fabric preform over a contoured surface.

In various embodiments, the NCF may comprise a non-woven carbon fiber fabric. The tacking the resin film to the NCF may include using at least one roller to press the resin film and the NCF together. The method may further comprise, applying a release poly-film to the resin-fabric sheet such that the resin film layer is located between the release poly-film and the NCF layer, the release poly-film configured to at least partially cover the resin film layer. The method may further comprise, rolling the resin-fabric sheet onto a roller. The method may further comprise: applying a vacuum to at least a portion of the resin-fabric preform to pull the resin-fabric preform against the contoured surface; and baking the resin-fabric preform. The tacking may be performed at the room temperature.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
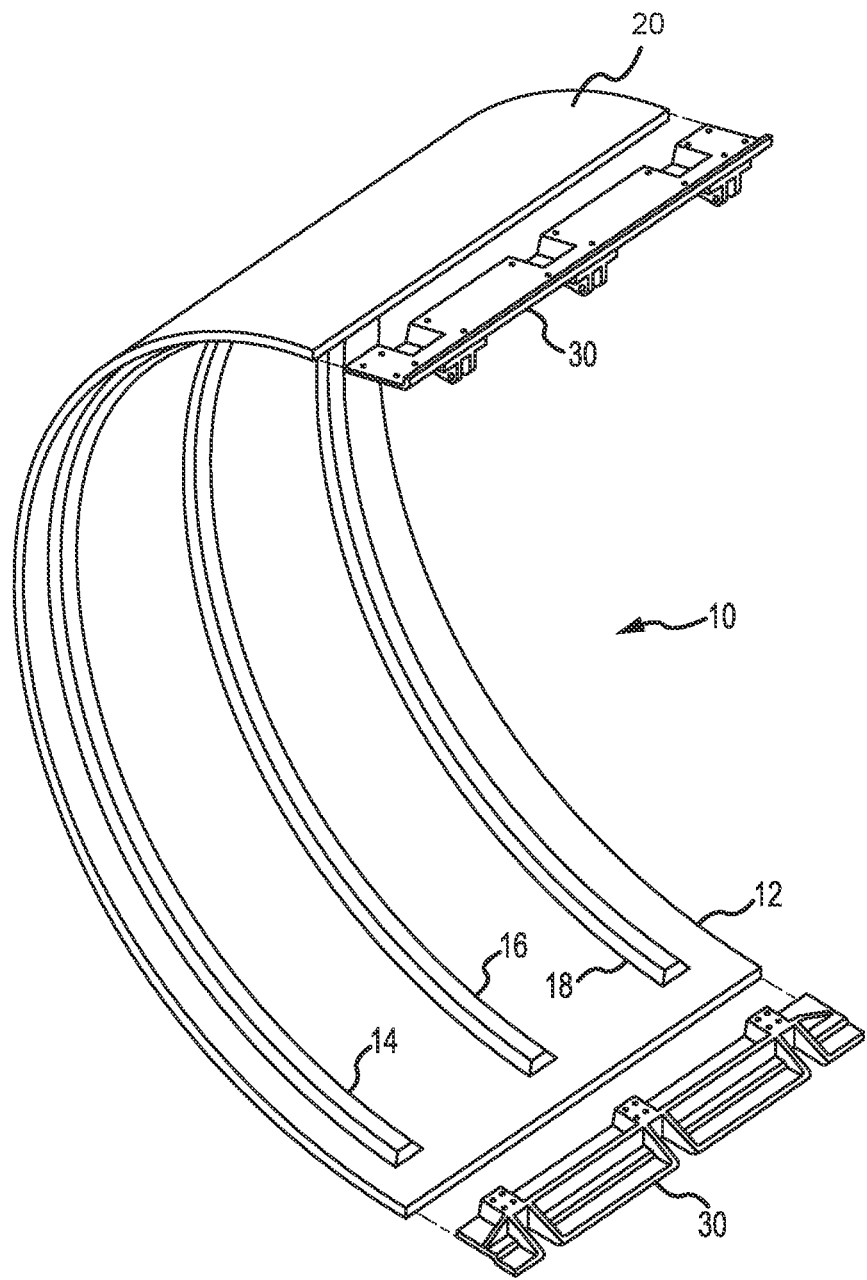
FIG. 1 illustrates a perspective view of a hollow hat fan cowl, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading and/or crosshatching lines may be used throughout the figures to denote different parts, but not necessarily to denote the same or different materials.

As used herein the term "prepreg" may refer to fibrous structures, with glass fibers, carbon fibers, aramid fibers, and/or the like, pre-impregnated with an uncured or at least partially uncured matrix material, such as a resin, where the substantial majority of fibers are generally completely encased in the matrix material.

As used herein the term "dry fabric" may refer to a fabric sheet made up of dry fibers (e.g., carbon fibers, glass fibers, and/or the like) that have not been impregnated with resin or matrix material.

As used herein the term "non-crimp fabric" or "NCF" may refer to a type of dry fabric made of uni-directional, non-woven, generally straight fibers (e.g., carbon fibers, glass fibers and/or the like).

As used herein the term "resin film" or "RF" may refer to a film or sheet of semi-solid, uncured or at least partially uncured resin. The RF may generally be supplied on a release paper and configured to be interleaved with layers of dry fabric during a film infusion process.

As used herein the term "drapability" may refer to the ability to smoothly drape a continuous sheet, or the like, over a contoured surface, especially a surface contoured in multiple directions. Stated another way, "drapability" may refer to how closely such structure takes on the shape of the surface over which it is being draped or placed without wrinkling or other defects.

Manufacturing laminated composite structures, such as those now commonly used in aerospace structures, can be time consuming and expensive. For example, a layup process for creating a laminated composite structure may comprise forming and cutting many thin composite layers and then laying them by hand onto or into a forming tool before curing. The layup process typically constitutes a large portion of the total labor hours needed to form a part, and is also a potential source of many quality problems due to its manual nature and its reliance on individual technician skill and performance.

Certain materials used in creating laminated composite structures are relatively expensive. Prepreg material is one example of a relatively expensive material. It constitutes a fiber fabric (woven or nonwoven) that has been pre-impregnated with an uncured or partially cured resin. Typically, the highest quality prepreg materials must be stored at low temperatures to prevent the resin from curing before a part is laid-up. The low temperature storage equipment adds costs, and even at low temperatures a high-quality prepreg typically has a limited shelf life before it must be cured, otherwise the performance of the end structure is compromised. Thus, even when stored at low temperatures, some prepreg is typically scrapped and wasted because it is not used within its shelf-life, adding to the operational cost of producing parts with prepregs.

Another disadvantage of prepregs is their lack of drapability. Because the individual fibers are fairly tightly bound together by the uncured, but viscous and very tacky resin, the fibers cannot easily slide relative to one another, and therefore the prepreg sheet does not stretch or compress easily. This can make draping large prepreg sheets over tool surfaces curved in multiple directions very difficult.

To address these difficulties, some laminate composite parts are made using a resin film infusion process which typically constitutes sheets of dry fabric (woven or nonwoven) layered alternately with separately laid up sheets of resin film, which are then heated for consolidation and then curing. During heating, the resin film first melts, or undergoes a significant viscosity reduction, and wets the adjoining fibers substantially completely coating or encapsulating them. The resin and now-wetted fibers then cure into a single solid structure. Such a resin film infusion process utilizes a dry fiber fabric feedstock (which is typically much more expensive than the resin film) that has a practically unlimited shelf life because it is kept separate from the resin film which has a limited shelf life, resulting in less waste of the fiber fabric and improved operational costs. Also, the dry fiber fabric and thin resin film sheets generally have better drapability properties than prepregs. As already known to those of ordinary skill in this art, these advantages make resin film infusion processes attractive for making many different parts.

A disadvantage of resin film infusion is that the dry fabric can be difficult to handle. Especially in the case of the nonwoven non-crimp fabrics (NCF), the dry fibers in the fabric can fray easily at the sheet edges, resulting in uneven fiber distribution and degraded material properties after curing. This risk is addressed by making the layup larger than the final part, and then after curing by trimming the perimeter of the part where fraying may have occurred. Any frayed edges are trimmed off, leaving an edge where the fiber distribution is more consistent. While this method effectively addresses fraying of the dry fabric on external edges of the part, it does not work for internal edges. Some layups are designed with detail pieces of fabric laid up inside of a larger field, where some or all of the edges of the detail sheet of fabric are not external edges, but rather are overlaid onto the larger sheets of fabric and resin film underneath. Such an internal edge cannot be trimmed after curing, and without trimming the edge of the sheet laid up on the tool becomes the "net edge" after curing.

In addition to the risk of fraying, there is also a related risk of the dry fabric and the resin film sheet edges not being perfectly aligned when laid up by the technician. Any misalignment of the two sheets or layers on an external edge can be trimmed away as described above, but internal edges cannot be trimmed after curing to solve this problem.

As a solution to the above problems previously inherent with resin film infusion processes, the inventors have developed a method of tacking together dry fiber fabric and resin film feedstocks to one another, before trimming into sheets and lay up on the forming tool. The two layers are merely loosely tacked together, and remain separate and distinct layers. The combined material thus maintains most of the advantageous drapability properties of the dry fabric and resin film used in a resin film infusion process. The combined material also advantageously controls fiber fraying at the edges, as the tackiness of the resin film tends to hold the fibers in place during handling and lay up. Also, if trimming into a desired sheet shape for lay up is performed after the resin film and dry fiber fabric are tacked together, then the two layers stay tacked together and the edges of each layer remain perfectly aligned during handling and after lay up on the forming tool. Use of this tacked-together, pre-combined resin film and dry fiber feedstock has been found to significantly increase the quality of a resin film infusion production process, and to significantly reduce the labor hours and resultant costs of the process.

With reference to FIG. 1, an aerostructure article, illustrated as fan cowl 10 is provided, in accordance with various embodiments. Although illustrated as a fan cowl 10, it is contemplated herein that the method of creating a composite structure, as described herein, may be used on any composite structure. Fan cowl 10 may be a co-cured composite structure having a unitary skin 12 and reinforcing hat sections (also referred to herein as hollow hat stiffeners) 14, 16, and 18. Reinforcing hat sections 14, 16, and 18 may be circumferentially extending and axially spaced apart sections. Reinforcing hat sections 14, 16, and 18 may comprise hollow hat stiffeners. The fan cowl 10 is shown as generally arcuate in shape, as illustrated in FIG. 1, but the use of the disclosed methods may extend to other shapes and applications. In various embodiments, longeron members 30 may be attached to the ends of fan cowl 10. Longeron members 30 may be used for hinging the fan cowl to another structure or for latching two such fan cowls together or for other desired purposes.

Figure 5:
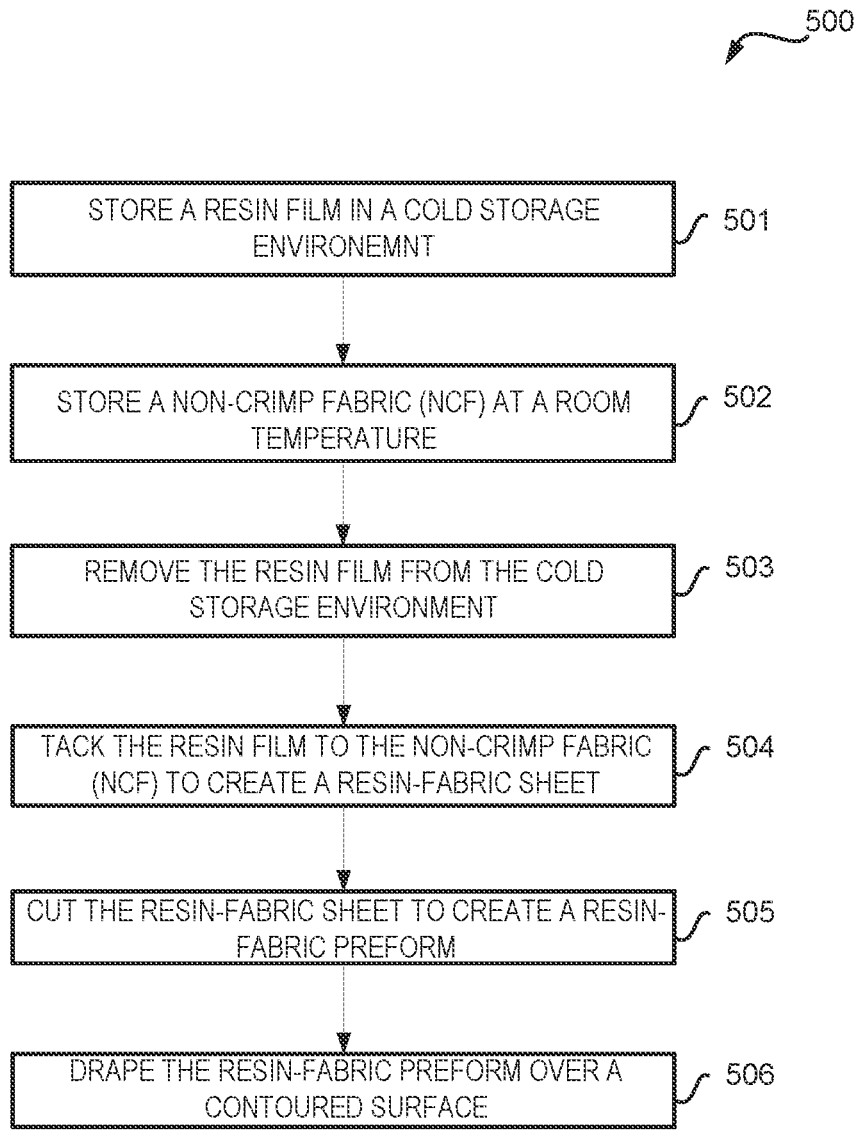
FIG. 5 illustrates a method, in accordance with various embodiments.
Figure 6:
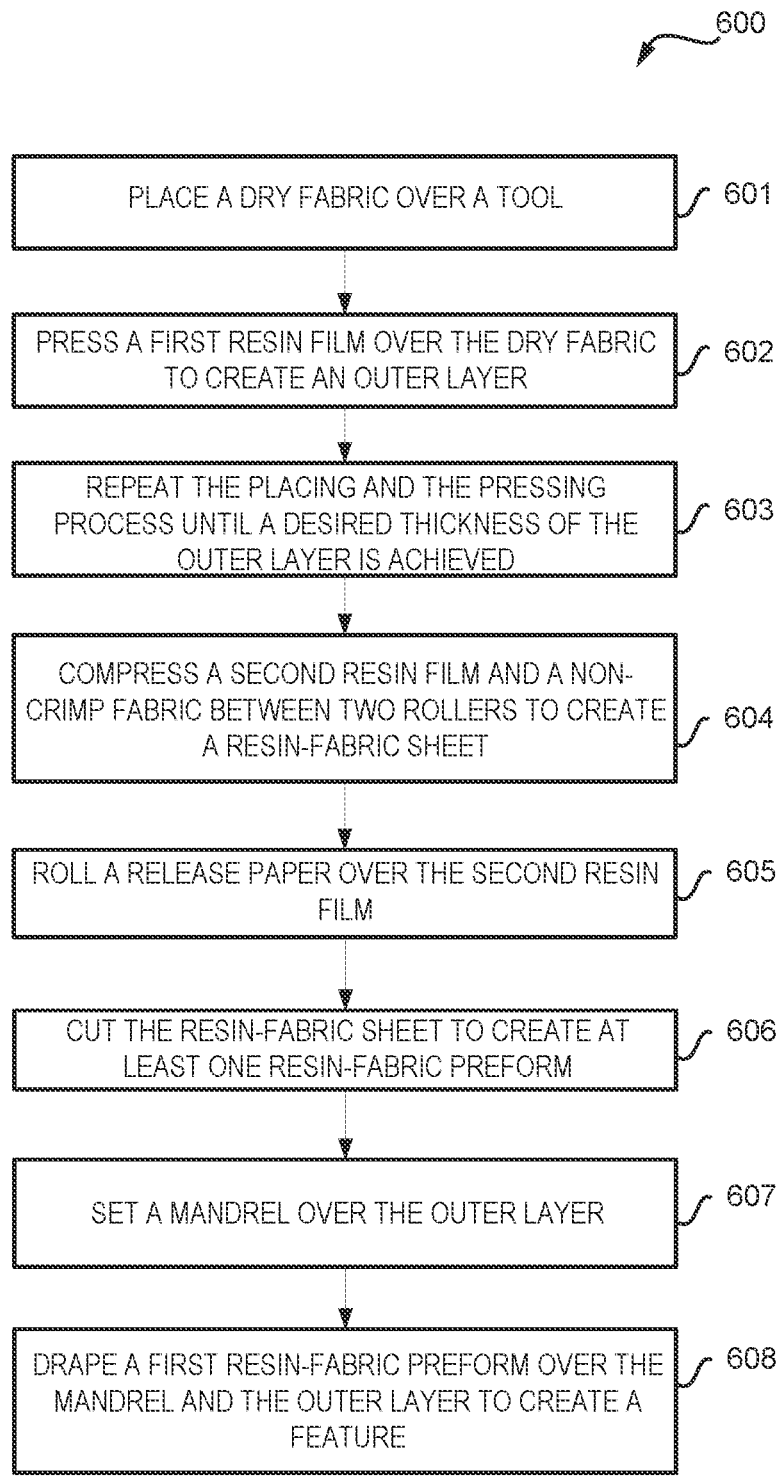
FIG. 6 illustrates a method for creating a fan cowl, in accordance with various embodiments.
Figure 7:
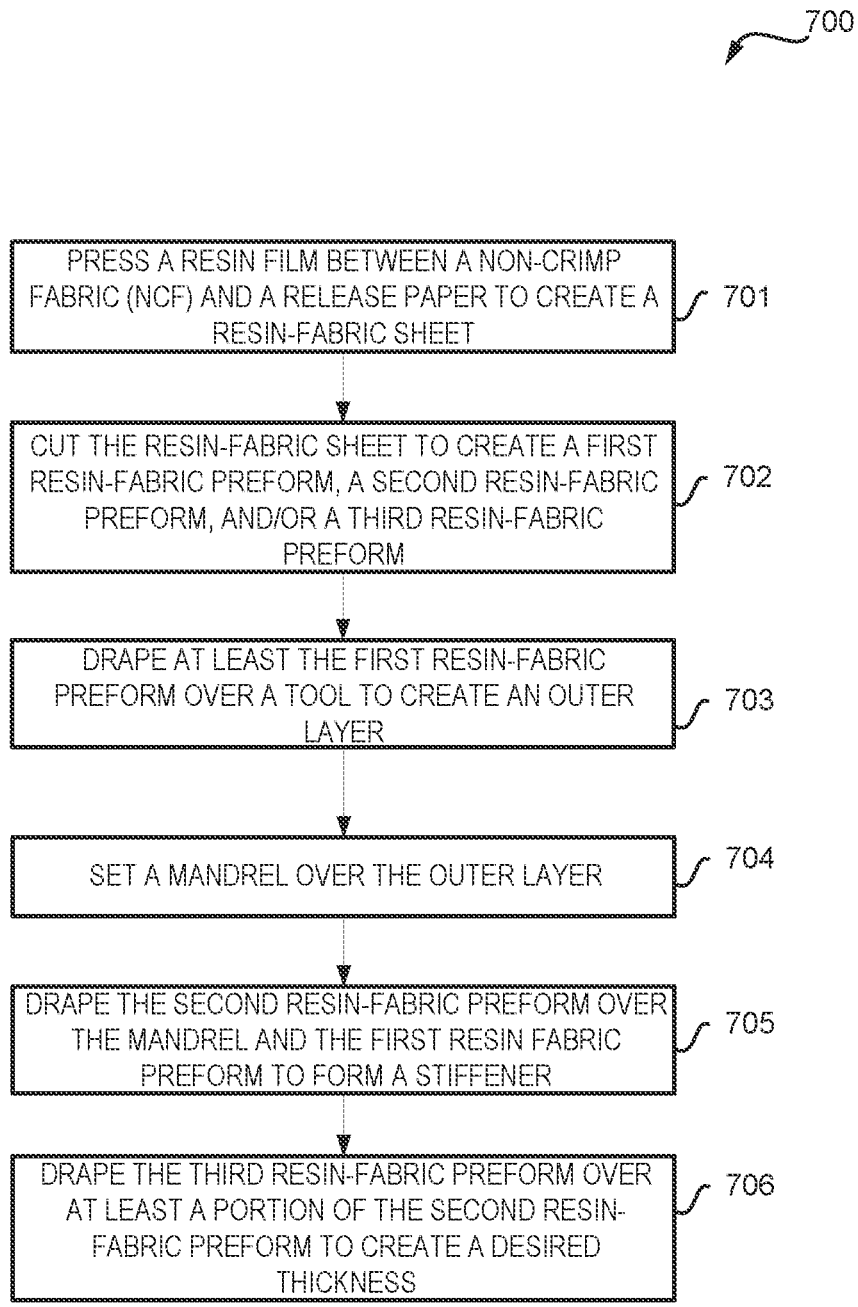
FIG. 7 illustrates a method for creating a fan cowl with hollow hat stiffeners, in accordance with various embodiments.

With reference to FIG. 5, a method 500 is provided, in accordance with various embodiments. Method 500 may be used in preparation for and during a composite layup process. With reference to FIG. 6, a method 600 for creating a fan cowl is provided, in accordance with various embodiments. Method 600 may be used for creating fan cowls with hollow hat stiffeners. With reference to FIG. 7, a method 700 for creating a fan cowl with hollow hat stiffeners is provided, in accordance with various embodiments. Method 700 may allow for on-demand combination of resin-film and non-crimp fabric in preparation for forming a fan cowl or other composite structures. With reference to FIG. 5, FIG. 6, and FIG. 7, the steps to method 500, method 600 and method 700, respectively, are provided herein.

Figure 2:
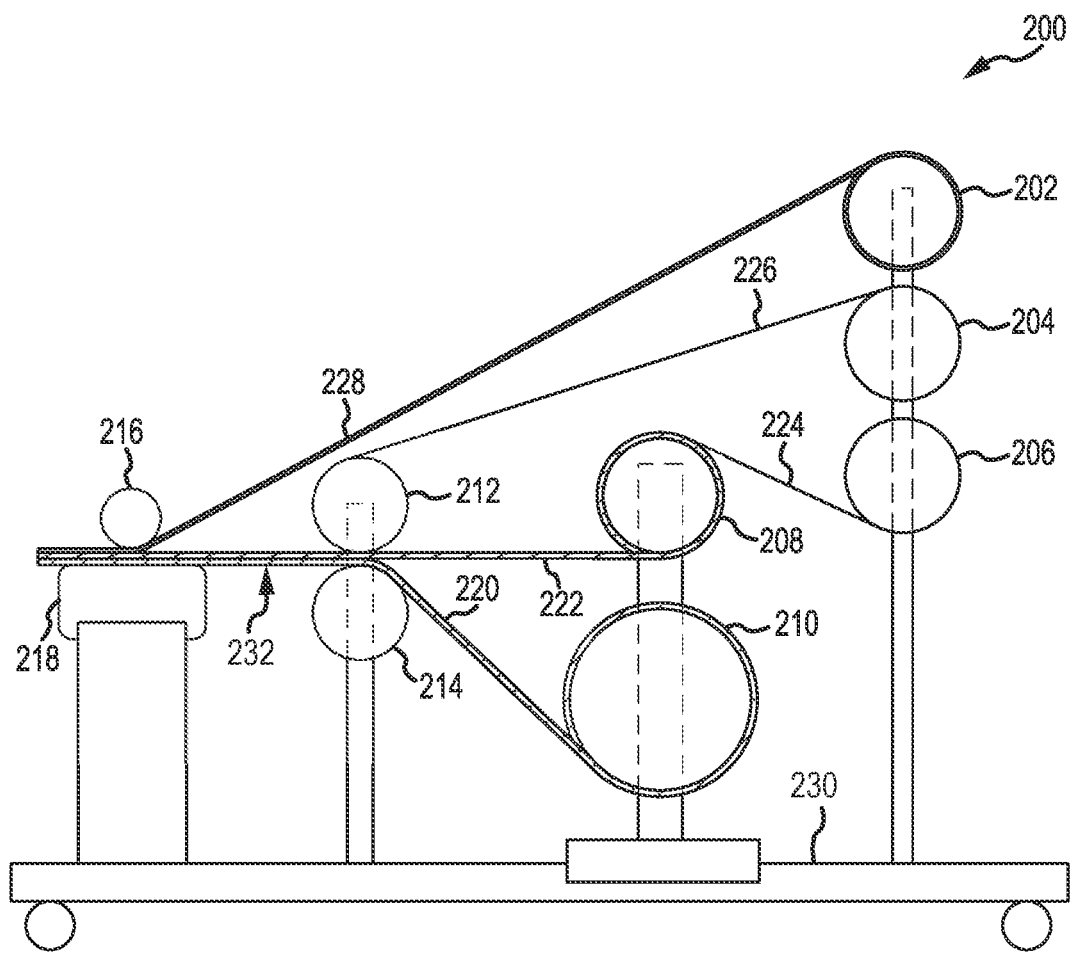
FIG. 2 illustrates a combiner for combining non-crimp fabric to resin film to create a resin-fabric sheet, in accordance with various embodiments.

With reference to FIG. 2, a combiner 200 is illustrated, in accordance with various embodiments. Combiner 200 may be for combining resin film (RF) 222 to a dry fabric, such as non-crimp fabric (NCF) 220. Combiner 200 may include a body 230 attached to one or more rolls for supplying or catching material. Roll 210 may supply NCF 220. Roll 208 may supply RF 222. Roll 202 may supply a release poly-film 228. Roll 206 may catch release paper (also referred to herein as a first release paper) 224. Roll 204 may catch release paper (also referred to herein as a second release paper) 226. Release poly-film 228 may comprise a drapable material. In various embodiments, release poly-film 228 may comprise a polyurethane film, a polyethylene film, a polypropylene film, or any other suitable poly material which is drapable. In various embodiments, first release paper 224 and second release paper 226 may comprise a poly material, a paper material, or any other suitable material. First release paper 224 may be removed from RF 222. Second release paper 226 may be removed from RF 222.

With momentary reference to FIG. 5, NCF 220 may be tacked to RF 222 by first roller 212 and second roller 214 to combine NCF 220 and RF 222 into a single resin-fabric sheet 232 (see step 504). With momentary reference to FIG. 6, NCF 220 and RF 222 may be compressed or pressed between first roller 212 and second roller 214 to combine NCF 220 and RF 222 into the single sheet (see step 604). Such combination may be performed at room temperature. However, in various embodiments, such combination may be performed with additional heat applied to increase the tackiness of RF 222. Then, with momentary reference to FIG. 6) release poly-film 228 may be rolled or otherwise applied over RF 222 (see step 605) to protect and cover RF 222 until it is ready for use. Release poly-film 228 may be compressed or pressed between third roller 216 and table 218 for tacking release poly-film 228 to RF 222. Stated another way, with momentary reference to FIG. 7, RF 222 may be pressed between NCF 220 and release poly-film 228 (see step 701).

In response to RF 222 being tacked onto NCF 220, as described herein, RF 222 may hold the fibers of NCF 220 in place to prevent NCF 220 from fraying during a cutting process. Furthermore, the tackiness of RF 222 may prevent fibers from fraying at the edges of NCF 220 during handling and lay up.

In various embodiments, resin-fabric sheet 232 may be immediately cut into preforms after being formed. However, resin-fabric sheet 232 may be rolled over itself or onto a roller for storage or transport before being cut into preforms.

Figure 3:
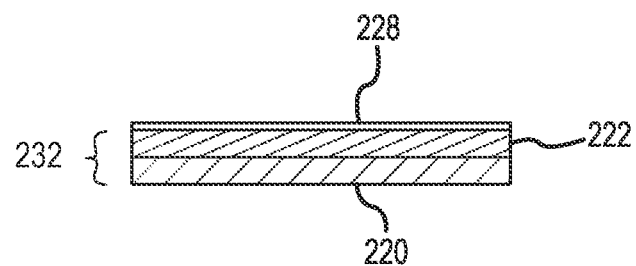
FIG. 3 illustrates the resin fabric sheet of FIG. 2, in accordance with various embodiments.

With reference to FIG. 3, a resin-fabric sheet 232 is illustrated having a release poly-film 228, in accordance with various embodiments. Resin-fabric sheet 232 may comprise NCF 220 (also referred to herein as an NCF layer), RF 222 (also referred to herein as a resin film layer), and, in various embodiments, release poly-film 228 (also referred to herein as a release poly-film layer). NCF 220 and RF 222 may comprise two distinct layers tacked together, without any (or minimal) wetting or coating of the fibers of NCF 220. Thus, the fibers of NCF 220 may remain substantially dry without resin.

With reference now to FIG. 3 and FIG. 5, in various embodiments, it may be desirable to store resin film (RF) 222 in a refrigerator or freezer (i.e., a cold storage environment) to extend the shelf-life of the RF 222 (see step 501). Non-crimp fabric (NCF) 220 may be stored at room temperature (see step 502). Thus, NCF 220 may be stored separately from RF 222 until time of use. Thus, at time of use, RF 222 may be removed from the cold storage environment (see step 503) to increase the temperature of the resin film to the room temperature. Accordingly, storing NCF 220 and RF 222 separately until time of use may free up storage space in the cold storage environment, decreasing the required volume of storage space in the cold storage environment.

Figure 8:
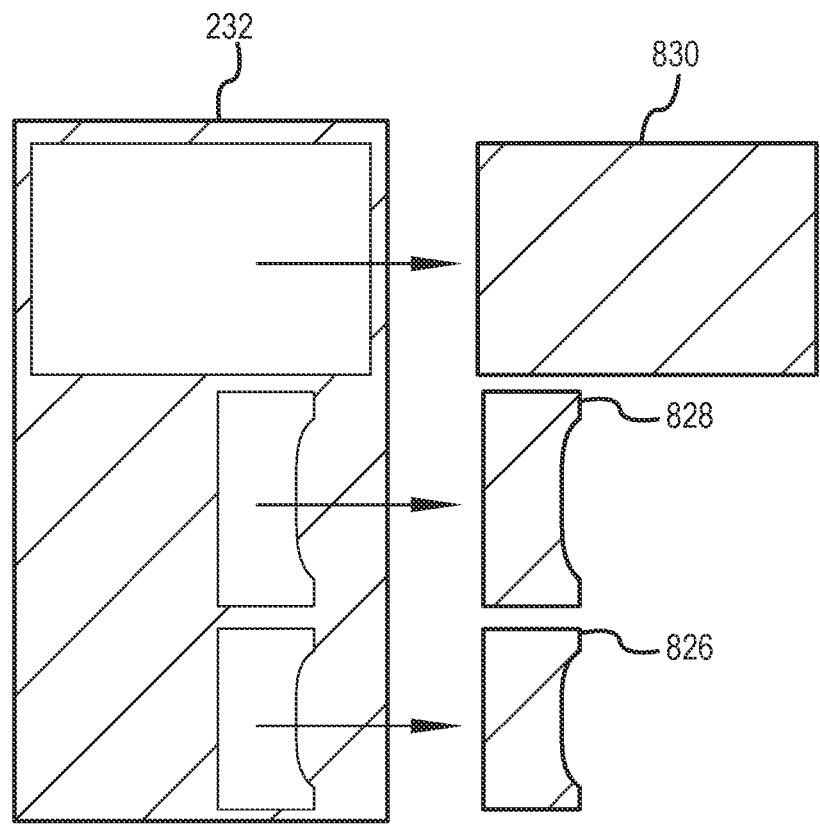
FIG. 8 illustrates resin-fabric preforms cut from a resin-fabric sheet, in accordance with various embodiments.

With reference to FIG. 8, resin-fabric preforms 826, 828, and 830 cut from resin-fabric sheet 232 are illustrated, in accordance with various embodiments. With momentary reference to FIG. 5 through FIG. 7, resin-fabric preform (also referred to herein as a first resin-fabric preform) 830, resin-fabric preform (also referred to herein as a second resin-fabric preform) 828, and resin-fabric preform (also referred to herein as a third resin-fabric preform) 826 may be cut from resin-fabric sheet 232 (see step 505, step 606, and step 702) via any suitable method such as via a knife or the like, for example. First resin-fabric preform 830, second resin-fabric preform 828, and third resin-fabric preform 826 may be cut from resin-fabric sheet 232 before draping over a tool for forming into a composite structure. First resin-fabric preform 830, second resin-fabric preform 828, and third resin-fabric preform 826 may comprise pre-determined geometries or shapes. In various embodiments, any one of resin-fabric preform 826, 828, and/or 830 may be draped over a contoured surface (see step 506) as described herein.

Figure 4:
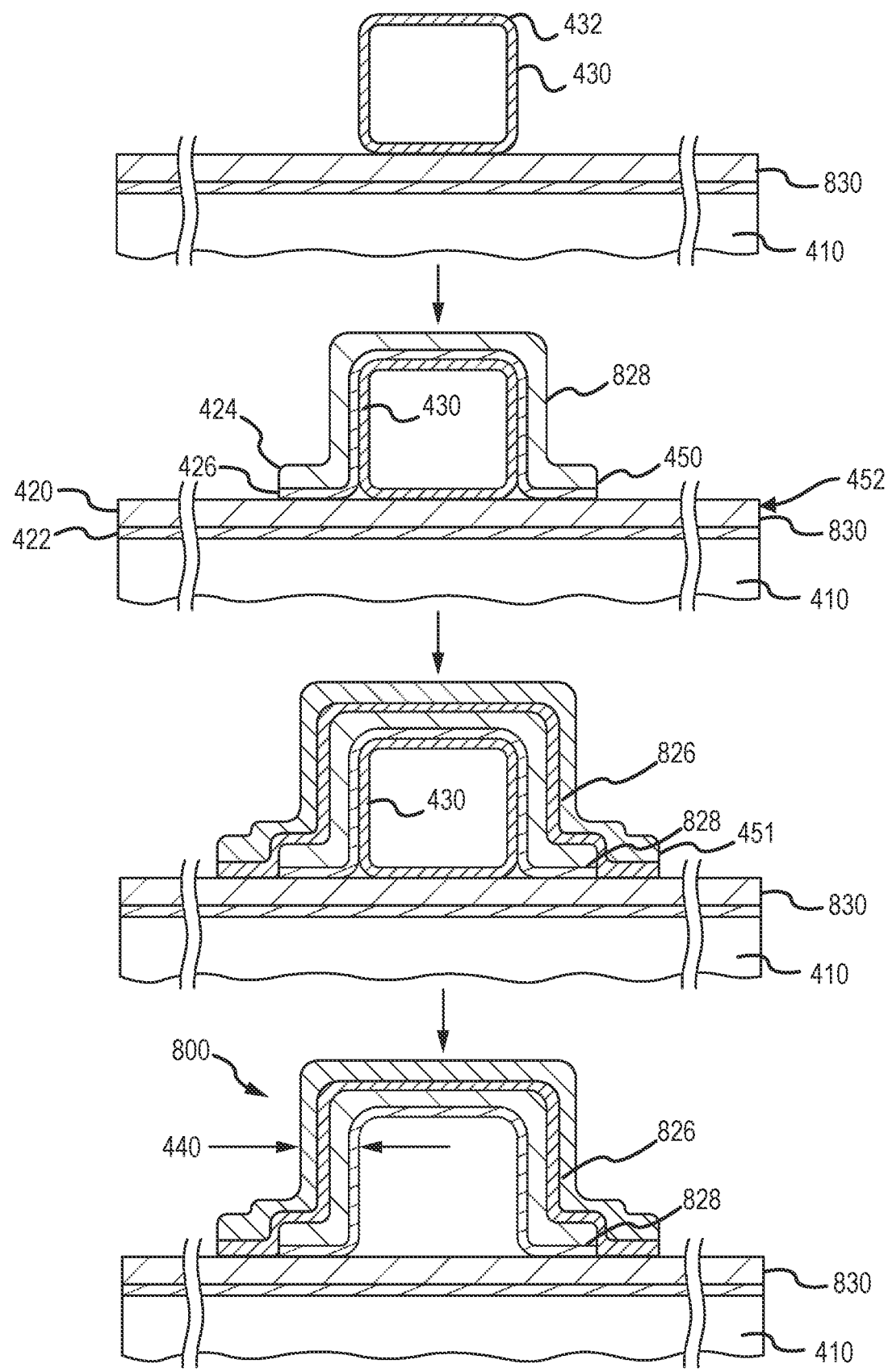
FIG. 4 illustrates a process of laying up a composite structure, in accordance with various embodiments.

With reference to FIG. 4 and FIG. 7 a process of creating a composite structure 800 is illustrated, in accordance with various embodiments. In various embodiments, first resin-fabric preform 830 may be draped or placed over tool 410 (see step 703). In various embodiments, tool 410 may have a shape complementary to the shape of a fan cowl. First resin-fabric preform 830 may create an outer layer of a composite structure. Although illustrated as a single layer, it is well known to a person having ordinary skill in the art that the outer layer of the composite structure may comprise multiple layers (i.e., multiple layers of resin-fabric preform 803) in order to create a desired thickness. FIG. 4 illustrates a single layer comprising the outer layer but it is contemplated that the outer layer may comprise multiple layers. In this regard, first resin-fabric preform 830 may, in fact, comprise multiple resin-fabric preforms. Furthermore, multiple resin-fabric preforms may be used to create a desired width of the outer layer. For example, a roll of resin-fabric preform may not be as wide as a desired width of a fan cowl. Thus, first resin-fabric preform 830 may comprise multiple resin-fabric preforms overlapped to create a desired width, in addition to the desired thickness. With momentary reference to FIG. 1, first resin-fabric preform 830 may form outer layer 20 of fan cowl 10. Mandrel 430 may be placed over first resin-fabric preform 830 (see step 704). In various embodiments, with further reference to FIG. 6, second resin-fabric preform 828 may be draped over mandrel 430 and over a portion of first resin-fabric preform 830 to create a feature of the composite structure (see step 705 and step 608) having a geometry similar to a shape of mandrel 430. In various embodiments, second resin-fabric preform 828 may comprise an internal edge 450. In various embodiments, internal edge 450 may be an edge of a dry fabric sheet located inward of the external or outside edges of a part. For example, internal edge 450 is located inward of external edge 452. Mandrel 430 may comprise a contoured surface 432. Next, third resin-fabric preform 826 may be draped over at least a portion of second resin-fabric preform 828 to create a desired thickness 440 (see step 706) of the feature. In various embodiments, third resin-fabric preform 826 may overlap internal edge 450. In this manner, third resin-fabric preform 826 may cover the previously exposed internal edge 450 and form a new exposed internal edge 451. In various embodiments, the feature may comprise a hollow hat stiffener.

In various embodiments, after a layup process is completed, a curing process may be performed on the preforms to consolidate the preforms into a unitary composite structure. The curing process may be performed by encapsulating the preforms between a vacuum bag and the tool and sucking air out of the bag. Thus, vacuum may be applied to the preforms. The curing process may further include heating the layup in an autoclave in a resin film infusion process as previously mentioned herein. In various embodiments, method 500, 600, and/or 700 (see FIGS. 5, 6 and/or 7, respectively) may include the curing process. The baking may be performed at baking temperatures of between one hundred degrees Celsius (212° F.) and three hundred degrees Celsius (572° F.), for example. The baking may be performed for any suitable duration such as between 20 minutes and 50 hours, for example. In various embodiments, baking may be performed using ramped temperatures or in cycles.

Next, with continuing reference to FIG. 4, mandrel 430 may be removed from between first resin-fabric preform 830 and second resin-fabric preform 828. With momentary reference to FIG. 1, the resulting composite structure 800 may comprise a fan cowl 10 having one or more reinforcing hat sections 14, 16, and/or 18 as illustrated in FIG. 1.

With reference to FIG. 4, in response to the first resin-fabric preform 830 being draped over tool 410 with the resin film layer 422 contacting tool 410, as illustrated in FIG. 4, the resin film layer 426 of the second resin-fabric preform 828 is placed adjacent to the NCF layer 420 of the first resin-fabric preform 830. However, in various embodiments, in response to the first resin-fabric preform 830 being draped over tool 410 with the NCF layer 420 contacting tool 410, the NCF layer 424 of the second resin-fabric preform 828 is adjacent to the resin film layer 422 of the first resin-fabric preform 830.

Figure 9:
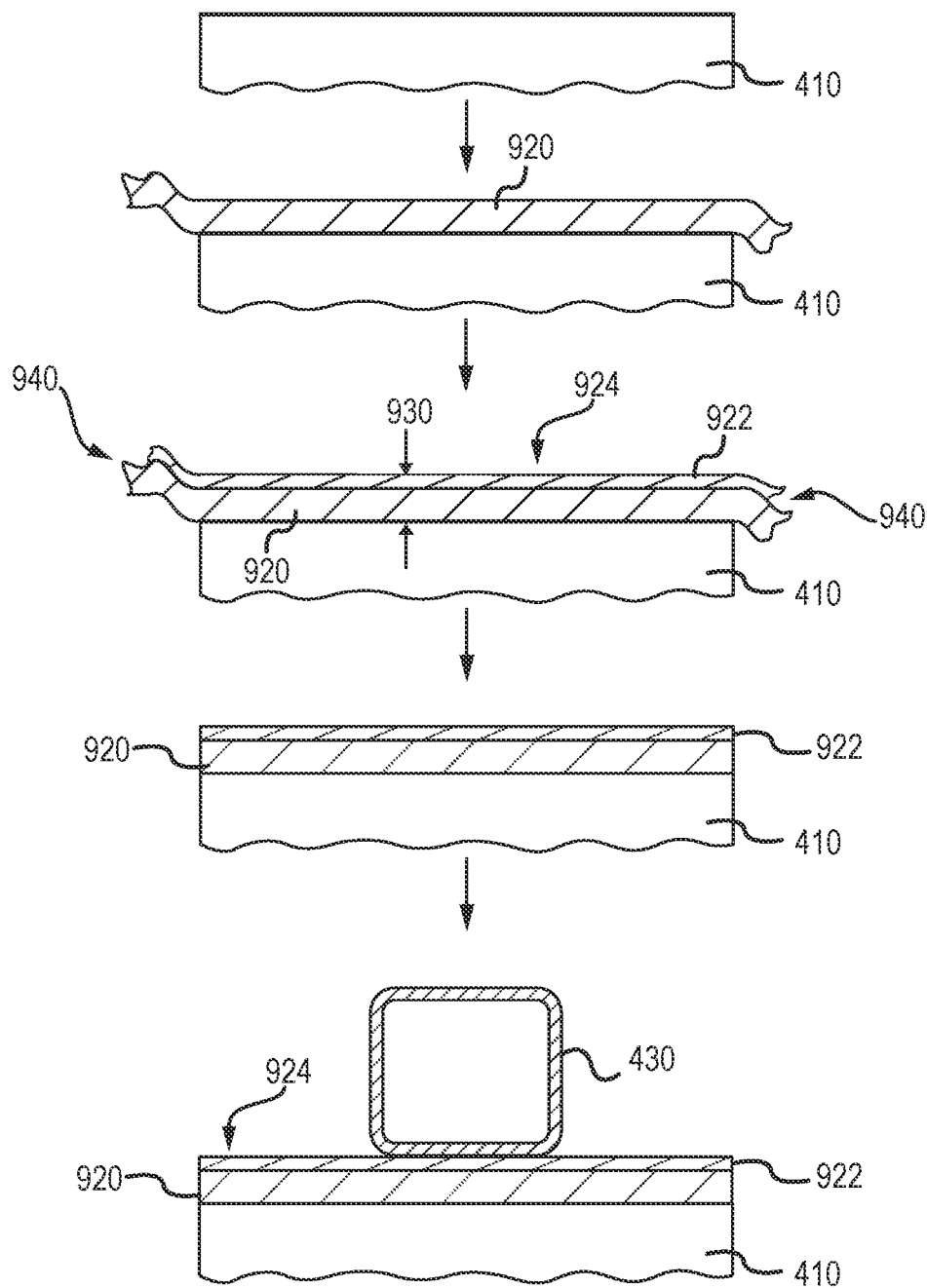
FIG. 9 illustrates a process of laying up a composite structure, in accordance with various embodiments.

With reference to FIG. 9, a process for laying up a composite structure is illustrated, in accordance with various embodiments. With further reference to FIG. 6, a dry fabric 920 may be placed over tool 410 (see step 601). A resin film (also referred to herein as a first resin film) 922 may be placed and pressed over dry fabric 920 while dry fabric 920 is draped over the tool 410, thus creating an outer layer 924 (see step 602). Outer layer 924 may be similar to outer layer 20 (see FIG. 1). In various embodiments, this process may be repeated to increase the thickness 930 of outer layer 924 to a desired thickness (see step 603). The outer edges 940 of outer layer 924 may be trimmed as illustrated in FIG. 9. Mandrel 430 may be placed over outer layer 924 (see step 607). In various embodiments, resin-film sheets may be placed over mandrel 930 and possibly other location of outer layer 924 as described in to FIG. 4. The outer edges 940 may be trimmed before and/or after the outer layer 924 has been cured in an auto clave.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method for creating a fan cowl with a hollow hat stiffener comprising:
    heating a resin film to a first temperature greater than a room temperature to increase a tackiness of the resin film;
    tacking a non-crimp fabric (NCF) to a first side of the resin film to create a resin-fabric sheet while the resin film is heated by passing the NCF and the resin film between a first roller and a second roller that compresses the NCF and the resin film;
    pressing the resin film between the NCF and a release poly-film via a third roller and a table in order to tack the release poly-film to a second side of the resin film of the resin-fabric sheet, wherein the resin film is pressed between the NCF and the release poly-film while the resin film is heated;
    cutting the resin-fabric sheet to a pre-determined shape to create at least one of a first resin-fabric preform, a second resin-fabric preform, and a third resin-fabric preform;
    draping at least the first resin-fabric preform over a tool to create an outer layer of the fan cowl;
    setting a mandrel over the outer layer; and
    draping the second resin-fabric preform over at least a portion of the mandrel and at least a portion of the outer layer to form the hollow hat stiffener having a geometry similar to a shape of the mandrel, wherein one or more edges of the second resin-fabric preform overlap the outer layer to create an exposed internal edge of the second resin-fabric preform and wherein the internal edge comprises a terminus of the second resin-fabric preform.

2. The method of claim 1, further comprising, draping the third resin-fabric preform over at least a portion of the second resin-fabric preform to create a desired thickness of the hollow hat stiffener.

3. The method of claim 2, further comprising, heating the first resin-fabric preform, the second resin-fabric preform, and the third resin-fabric preform to cure the first resin-fabric preform, the second resin-fabric preform, and the third resin-fabric preform to create the fan cowl.

4. The method of claim 3, further comprising, removing the mandrel from the fan cowl.

5. The method of claim 1, wherein in response to the first resin-fabric preform being draped over the tool with the resin film layer contacting the tool, the resin film layer of the second resin-fabric preform is adjacent to the NCF layer of the first resin-fabric preform.

6. The method of claim 1, wherein in response to the first resin-fabric preform being draped over the tool with the NCF layer contacting the tool, the NCF layer of the second resin-fabric preform is adjacent to the resin film layer of the first resin-fabric preform.

7. The method of claim 1, wherein the resin film layer comprises a thermosetting resin.

8. The method of claim 1, wherein the non-crimp fabric comprises a dry fabric made of uni-directional, non-woven, fibers.

9. The method of claim 1, wherein the resin-fabric sheet is cut to the pre-determined shape subsequent to pressing the resin film between the NCF and the release poly-film without storing the resin-fabric sheet in a cold storage environment.

10. The method of claim 9, wherein the resin-fabric sheet is cut to the pre-determined shape immediately after being formed.

11. The method of claim 1, wherein the NCF remains substantially dry while the resin film is pressed between the NCF and the release poly-film.

\* \* \* \* \*